Sept. 12, 1939.    M. M. HIRTENSTEIN    2,172,959
SUNGLASSES
Filed Feb. 11, 1939
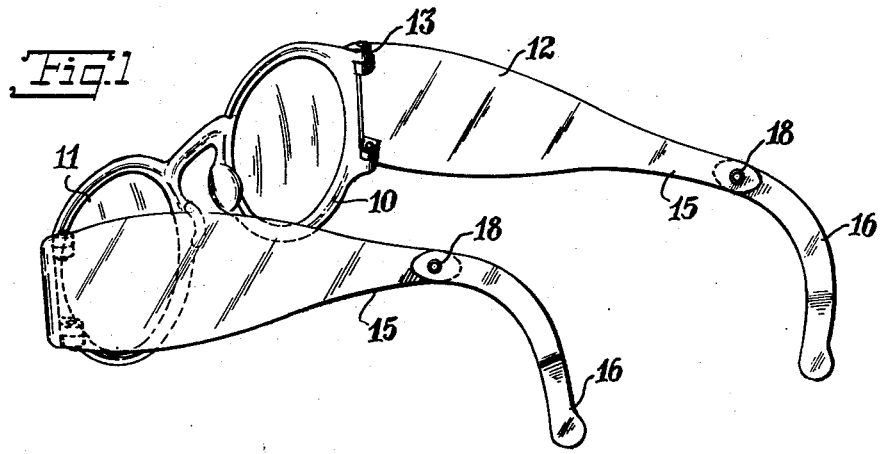
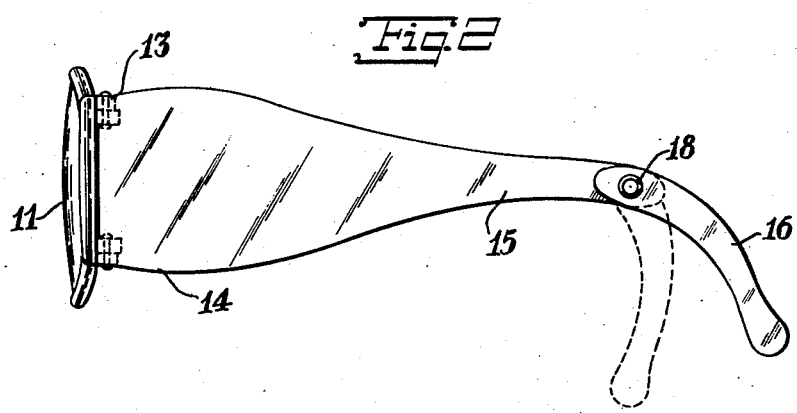
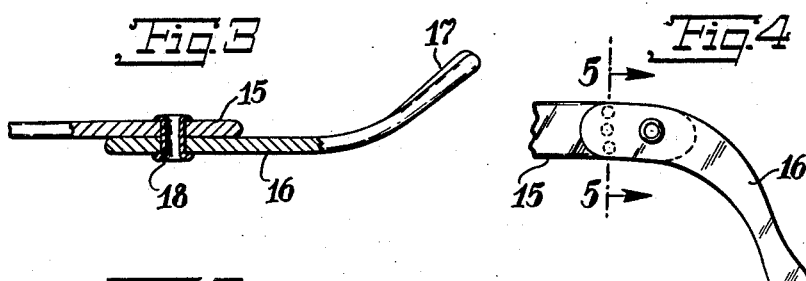
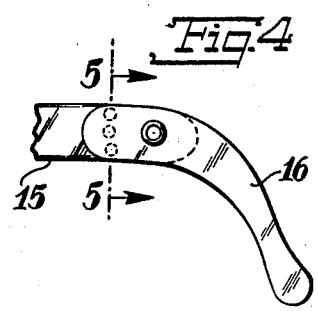
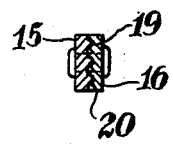
INVENTOR
Max M. Hirtenstein
BY
Edw. S. Higgins
ATTORNEY Patented Sept. 12, 1939

2,172,959

UNITED STATES PATENT OFFICE 2,172,959

SUNGLASSES

Max M. Hirtenstein, Jamaica, N. Y., assignor to Ben Hur Products, Inc., New York, N. Y., a corporation of New York Application February 11, 1939, Serial No. 255,959

2 Claims. (Cl. 2—13)

This invention relates generally to eyeglasses and more particularly to so-called sunglasses.

Sunglasses are usually purchased off the counter without any preliminary measurements or fitting or without any expert aid, with the result that such glasses are usually a misfit, either too small or too large with consequent annoyance. Such glasses should fit snugly in order to prevent the sun's rays from getting to the eyes through the sides, top or around the frame.

It is an object of the present invention to provide sunglasses that can be adjusted to the size of the head of the wearer.

A further object is to provide sunglasses that may readily be fitted to the head of the wearer.

Another object is to provide sun glasses that may readily be made longer or shorter as desired.

A still further object is to prevent the sunglasses from slipping off the nose, or from becoming dislodged.

Still another object is to prevent the passage of the sun between the frame of the glasses and the eyes of the wearer.

A further object is to provide a pair of sunglasses that is comfortable to wear and smart and attractive in appearance.

Another object is to provide such sunglasses that are economical to manufacture and sturdy in use.

In the drawing, Fig. 1 is a perspective view of a pair of sunglasses embodying my invention.

Fig. 2 is a side view thereof.

Fig. 3 is a sectional view on the plane of the line 3—3 of Fig. 2.

Fig. 4 is a fragmentary view of a modified form of temple arm for the sunglasses.

Fig. 5 is a sectional view on the plane of the line 5—5 of Fig. 4.

The improved sunglasses comprise the frame 10 for the glass lenses 11. The frame is formed of plastic material, Celluloid or other suitable material suitably colored. The lenses 11 are preferably colored as is usual.

An arm or temple portion 12 is hinged to each side of the frame by means of a pair of hinges 13. Each arm is formed with a wide flat portion 14 which curves to a narrow portion 15. Pivoted to the narrow portion 15 is an extension 16 which terminates in a downwardly and inwardly curved portion 17. The extension is connected to the narrow portion 15 by means of a rivet, eyelet or pivot pin 18.

In using the improved sunglasses, the frame is placed on the bridge of the nose and the arms or temple portions 12 placed above and around the ears. The wide flat portions 14 prevent the sun's rays from entering at the sides. To lengthen the arms 12 the extensions are straightened out to form an elongation of the arms 12; and to shorten the arms the extensions are moved downwardly around the ears thus shortening the overall length of the arms. The inwardly curved end portions 17 of the extensions conform to the shape of the rear portion of the head of the wearer and snugly engage the head. It will be understood that by shortening the length of the arms 12 by turning the extensions 16 downwardly around the ears, the frame 10 is drawn snugly but comfortably toward the eyes thus making said frame fit the eyes, leaving but little space between the eyes and the lenses of the glasss thus preventing any chance of the sun's rays entering from the top between the frame and the eyes.

A number of spaced beads 19 may be formed on one surface of the outer free ena of each arm 12 which are adapted to seat in a number of spaced grooves 20 formed in the inner adjacent surface of the extension member as shown in Figs. 4 and 5 in order to hold the extension members in adjusted position.

I claim:

1. A pair of sunglasses comprising a Celluloid frame for supporting glass lenses, side arms formed of the same material, each arm consisting of an elongated flat wide portion substantially the height of the frame and being hinged to the frame the axis of the hinge joint being vertically arranged and an integral narrow flat portion forming an elongation of the wide portion, a flat extension member pivoted to the outer free end of said narrow portion, said extension member terminating in an outer end curved downwardly in one direction to fit around the ear and curved inwardly in another direction to fit around the rear portion of the head the axis of said pivoted joint being disposed at right angles to the axis of said hinge joint whereby said extension member moves edgewise of the narrow portion of the arm.

2. A pair of sunglasses comprising a Celluloid frame for supporting glass lenses, side arms formed of the same material, each arm consisting of an elongated flat wide portion substantially the height of the frame and being hinged to the frame the axis of the hinge joint being vertically arranged and an integral narrow flat portion forming an elongation of the wide portion, a flat extension member pivoted to the outer free end of said narrow portion, the axis of said pivoted joint being disposed at right angles to the axis of said hinge joint whereby said extension member moves edgewise of the narrow portion of the arm said extension member terminating in an outer end curved downwardly in one direction to fit around the ear and curved inwardly in another direction to fit around the rear portion of the head, and beads formed on one surface of the outer end of each narrow portion, each extension member being formed with grooves adapted to coact with said beads to hold the extension member in adjusted position.

MAX M. HIRTENSTEIN.